United States Patent [19]

Ferm

[11] 4,243,563
[45] Jan. 6, 1981

[54] CALCIUM POLYSULFIDE SOIL STABILIZATION METHOD AND COMPOSITIONS

[75] Inventor: Richard L. Ferm, Lafayette, Calif.

[73] Assignee: Chevron Research Company, San Francisco, Calif.

[21] Appl. No.: 21,134

[22] Filed: Mar. 16, 1979

Related U.S. Application Data

[63] Continuation-in-part of Ser. No. 826,220, Aug. 22, 1977, abandoned, which is a continuation-in-part of Ser. No. 730,486, Oct. 7, 1976, abandoned.

[51] Int. Cl.³ .................... C08L 1/28; E01C 3/04
[52] U.S. Cl. .................... 260/17 R; 47/9; 47/DIG. 10; 260/13; 260/17.5; 423/561 R; 423/565; 427/136
[58] Field of Search .................... 260/17 R, 29.6 MQ; 61/36 C, 36 R, 36 B

[56] References Cited

U.S. PATENT DOCUMENTS

| 2,143,286 | 1/1939 | Shiffler et al. | 423/561 R |
| 3,335,019 | 8/1967 | Marshall | 106/900 |
| 3,719,050 | 3/1973 | Asao et al. | 61/36 C |
| 3,763,072 | 10/1973 | Krieger | 61/36 C |

FOREIGN PATENT DOCUMENTS 1222645 2/1971 United Kingdom .................... 61/36 R

OTHER PUBLICATIONS

Chem. Absts., vol:71:80281w "Development–Soils," Dayal.
Chem. Absts. vol:73:87116w, "Soil Sealing–Incorporate–Polymer", Katzer.
Chem. Absts., vol. 73:87106t, "Polyurethane for Soil Improvement," Bergweiler.

Primary Examiner—Edward M. Woodberry
Attorney, Agent, or Firm—D. A. Newell; S. R. LaPaglia

[57] ABSTRACT

Soil is stabilized and strengthened by application of solutions of calcium polysulfides. Compositions useful for soil stabilization comprise aqueous solutions of calcium polysulfide or aqueous mixtures of calcium polysulfides and dispersed organic polymers. Emulsifiers provide soil penetration.

28 Claims, No Drawings

CALCIUM POLYSULFIDE SOIL STABILIZATION METHOD AND COMPOSITIONS

RELATED APPLICATION

This application is a continuation-in-part of U.S. Pat. application Ser. No. 826,220, filed Aug. 22, 1977 (now abandoned), which in turn is a continuation-in-part of U.S. Pat. application Ser. No. 730,486, filed Oct. 7, 1976 (now abandoned).

BACKGROUND OF THE INVENTION

This application is directed to a method of stabilizing soils, and more particularly, is concerned with the application of calcium polysulfides or calcium polysulfide-latex mixtures to ground surfaces for the purpose of stabilization.

In many applications, it is desirable to provide some method of stabilization of soils, i.e., protection of the soil ground surface that falls short of paving the surface with asphalt or concrete or other such material, and yet provides resistance to physical damage protection from wind and water erosion, etc. Thus, it is desirable that protection be imparted to soils and particularly to prevent erosion, blowing of dust, run off from rain water and even protection from physical impact, such as walking of pedestrians and animals and driving of vehicles.

A particularly useful application lies in the production of road beds which will be covered with such coatings as asphalt, concrete and highway construction. Thus, during road bed preparation, it is usual practice to level the surface and allow it to stabilize before paving. In such cases, vehicular traffic is sometimes allowed during the stabilizing period, and it is then necessary to constantly sprinkle with water to keep down dust formation.

It is also desirable to protect such surfaces from mechanical degradation.

DESCRIPTION OF THE PRIOR ART

Alkaline metal and alkaline earth metal polysulfides have been employed for soil treatment. Calcium polysulfide has been employed as coagulating agents in heavy clay soil to increase the perculation of water through them. Such use is disclosed by N. Rozanov and Pochvovedenie, 24, No. 3-4, 1929. More recently, calcium polysulfide has been marketed extensively for this purpose. In such applications, calcium polysulfide solution is applied to the ground surface at levels ranging from about 10 to 50 gallons of 29% aqueous solution per acre (about 3.4 to 17.1 g/m$^2$ of dissolved calcium polysulfide). The soil is then generally disced to disperse the polysulfide through the upper layers of the soil.

SUMMARY OF THE INVENTION

It has now been found that excellent stabilization of soil and soil-based structures can be accomplished by the application to the surface of a soil of from about 120 to 1200 grams, preferably 200 to 1000 g/m$^2$ of calcium polysulfide. The polysulfide is applied in aqueous solution. The polysulfide will contain an average of from about 2 to about 7 atoms of sulfur per atom of calcium. A penetrating soil stabilizing composition comprises an aqueous solution of calcium polysulfide containing sufficient emulsifier compatible with calcium polysulfide to aid the composition in soil penetration. A soil stabilizing composition which provides substantial wet strength to soil comprises an aqueous solution of calcium polysulfide and a latex of an organic polymer.

DETAILED DESCRIPTION OF PREFERRED EMBODIMENTS

In an embodiment of this invention, aqueous mixtures of calcium polysulfide and dispersed particles of organic polymers are employed. The mixtures are prepared by mixing calcium polysulfide solutions and latexes (aqueous dispersions of the polymers). The dispersed organic polymer is present in the calcium polysulfide solution in sufficient amount to impart wet strength to the soil. A latex is optionally used in amounts up to 15 weight percent, preferably about 0.001–15 weight percent based on the total composition. These latex compositions will preferably comprise from about 0.5 to 30% by weight of calcium polysulfide, from 0.02 to 15% by weight of the organic polymer and from about 0.001 to 5.0% by weight of an emulsifier which is compatible with calcium polysulfide. The balance will be water to make up 100%.

The calcium polysulfides employed are articles of commerce, and are conventionally prepared by the reaction of sulfur with lime water. Their preparation is described on page 63 of *A Text-Book of Organic Chemistry*, Volume III, Part I, edited by J. Newton Friend, Charles Griffin and Co., London 1925. For agricultural uses, they are conventionally sold as concentrated solutions, e.g., about 30 weight percent. The calcium polysulfide may contain about 2 to 7 atoms of sulfur per atom of calcium, but normally contains about 2 to 5 atoms of sulfur per atom of calcium, and preferably about 2.5 to 4.5 atoms of sulfur per atom of calcium.

The various dispersions or latexes used in combination with the polysulfide solution are made with and contain a variety of emulsifiers - anionic, cationic, amphoteric and non-ionic. Some of the emulsifiers, particularly anionic and cationic emulsifiers, are not compatible with aqueous calcium polysulfide. Mixing a latex containing an incompatible emulsifier with the solution will cause coagulation of the polysulfide and/or the dispersed polymer. Those that coagulate are not, of course, suitable for use in an embodiment of this invention.

In some instances it is desirable to include auxiliary wetting agents in the compositions of the invention in order to facilitate and speed penetration into soil surfaces, etc. These are from the same class of compounds used as emulsifiers in forming the latexes. Both wetting agents and latex emulsifiers are hereafter referred to as emulsifiers. They may also be employed with the calcium polysulfide solution (without latex), in amounts sufficient to enhance the soil wetting and improve penetration by the solution. Usually from about 0.001 to 5.0%, preferably 0.05 to 5%, by weight will be employed with the calcium polysulfide solutions. With the calcium sulfide-polymer compositions a like amount of emulsifier, i.e. up to 5.0% by weight, will be sufficient for wetting. They may be added by initially using an amount of emulsifier greater than that necessary to form the latex, or they may be added subsequently when the stabilizing compositions are made. A wetting agent may also be applied to the soil before treatment with the stabilizing composition.

An emulsifier may be tested for its suitability for making the latex or for use as an auxiliary wetting agent in the compositions by mixing 1% by weight of the emulsifier with 20% by weight of calcium polysulfide in aqueous solution. The mixture is stirred by hand or machine for 5 minutes. Materials that produce a coagulated mass at the end of the mixing periods are unsuitable for use in this invention.

In some cases the identity of the emulsifiers in commercial latexes is not known. In such cases, the compatibility of the latex itself with the calcium polysulfide (i.e., the compatibility of the emulsifier) may be tested in the same manner as the emulsifier, except that 10 weight percent of the dispersed organic polymer is combined with 20 weight percent of calcium polysulfide in aqueous solution.

The latexes employed in the compositions of this invention may be either natural or synthetic. The natural latexes are derived from the cells of seed plants. The synthetic latexes are defined as water emulsions of synthetic rubber or plastic obtained by emulsion polymerization. Emulsion polymerization is described in "Vinyl and Related Polymers", Schildknecht, 1952, John Wiley & Sons, NY, NY.

Suitable monomers for the polymerization include unsaturated hydrocarbons, for example ethylene and propylene, butadiene, isobutylene, styrene, etc.; vinyl halides, for example vinyl chloride, vinylidene chloride, vinyl fluoride, 2-chlorobutadiene, etc.; derivatives of unsaturated acids including ethyl acrylate, acrylonitrile, acrylamide, methyl methacrylate, dibutylmaleate; derivatives of unsaturated alcohols including vinyl esters such as vinyl acetate, vinyl benzoate, vinyl laurate, allyl propionate, etc.; unsaturated ethers such as methyl vinyl ether, allyl butyl ether; unsaturated ketones such as methyl vinyl ketone, allyl phenyl ketone, isopropenyl methyl ketone; and similar unsaturated monomers. In addition to homopolymers of the above compounds, copolymers, terpolymers and the like may also be prepared from mixtures of unsaturated monomers, such as those described above. Some typical mixed polymers include vinyl acetate-butyl acrylate copolymer, ethylene-vinyl acetate copolymer, butadiene-acrylonitrile copolymer, dibutyl maleate-vinyl acetate copolymer, methyl vinyl ether-sytrene copolymer, and the like. Furthermore, the full or partial hydrolysis of polyvinyl acetate produces a polyvinyl alcohol or a copolymer of vinyl acetate-vinyl alcohol.

Another type of latex suitable for use in the compositions of this invention are the polyurethane latexes.

The polymers or copolymers making up the bulk of the solid content of the latex have weight average molecular weights in excess of 5000 and as high as 600,000. Preferably the molecular weight is in the range of 20,000 to 200,000. In the latex, these polymers and copolymers have particle sizes in the range of 0.005 to 10 microns, the preferred compounds having sizes in the range of 0.02 to 2 microns.

The emulsifiers useful in forming latexes for this invention are those previously indicated which are compatible with calcium polysulfide and do not coagulate or form a gummy mass upon mixing with calcium polysulfide. These embulsifiers may be cationic, anionic, amphoteric or non-ionic. The non-ionic emulsifiers are preferred, and the anionic emulsifiers are generally incompatible and not useful. Among the non-ionic emulsifiers useful in this invention are the alkoxylated compounds such as propoxylated or ethoxylated amines, alcohols, alkylphenols, amides, mercaptans, fatty acids, polypropylene glycols, esters, and the like. Examples of useful ethoxylated compounds are: a mixture of $C_{18}$-$C_{22}$ straight-chain alkylamines ethoxylated with an average of 5 ethylene glycol units, a mixture of $C_{12}$-$C_{14}$ straight-chain alkylamines ethoxylated with an average of 5 to 10 ethylene glycol units, lauryl alcohol ethoxylated with 4 ethylene glycol units, oleyl alcohol ethoxylated with 2 to 6 ethylene glycol units, diethylene oxide stearyl ether, 3,6,9,12-tetraoxatetracosanol, p-octylphenoxy(tetraethoxy) ethanol, p-nonylphenoxy(octaethoxy) ethanol, p-octylphenoxy(heptaethoxy) ethanol, p-nonylphenoxy(decaethoxy) ethanol, 1-hydroxy-3,6,9-trioxaundecyl heptaphenyl ether, lauramide ethoxylated with 3 ethylene glycol units, stearmide ethoxylated with 4 to 10 ethylene glycol units, 15-hydroxy-3,6,9,12-tetraoxytetradecyl palmitamide, dodecylmercapto polyethylene glycol ether, 3,6,9-trioxa-12-thiadocosanol, polyethylene glycol laurate, stearic acid esterified with pentaethylene glycol, 11-hydroxy-3,6,9-trioxaundecyl oleate, polypropylene glycol etherified with polyethylene oxide to form a two-block copolymer, ethoxylated digylcerides, hexaethylene glycol glycerol distearate, pentaethylene glycol glycerol monostearate, 1-hydroxy-3,6,9,12-tetraoxapentadecane-14,15-dioleate, hydroxyethyl cellulose and similar non-ionic dispersants.

Other useful non-ionics include the sugar ethers such as sorbitan monooleate, sorbitan monostearate, also ethoxylated sugar ethers such as polyoxyethylene sorbitan monopalmitate.

Cationic emulsifiers are generally useful in this invention, and include such compounds as the quaternary amines, for example cetyl pyridinium chloride, eicosyl trimethyl ammonium bromide, dimethyl-dihexadecyl ammonium chloride, p-dodecylbenzyl trimethyl ammonium chloride, ethoxylated fatty amine quaternized with methyl chloride.

Very few anionic emulsifiers are compatible with calcium polysulfide, but one satisfactory compound is the ammonium salt of a sulfated fatty alcohol ethoxylate. Usefulness of any emulsifier is determined by the previously described test.

The preferred emulsifiers for this invention are the ethoxylated primary amines, e.g., primary amines having from 12 to 22 carbon atoms ethoxylated with an average of 5 to 10 ethyleneglycol units, i.e., compounds such as 3,6,9,12,15,18-hexaoxa-21-azatritriacontanol, 3,6,9,12,15,18-hexaoxa-21-azahexatriacontanol, 3,6,9,12,15,18,21,24,27-nonaoxa-30-azanonatriacontanol, 3,6,9,12,15,18,21,24,27-nonaoxa-30-azadotetracontanol, 3,6,9,12-tetraoxa-15-azahexatriacontanol, 3,6,9,12,15-hexaoxa-18-azaheptatriacontanol, and mixtures thereof. A particularly preferred emulsifier is a mixture of dodecanylamine and tetradecanylamine ethoxylated with an average of 7 to 10 ethylene glycol units.

Another preferred type of emulsifier is the nonylphenols, ethoxylated with 7 or 8 ethylene glycol units, e.g., a mixture of 21-hydroxy-3,6,9,12,15-pentaoxaeicosanyl p-nonylphenyl ether and 24-hydroxy-3,6,9,12,15,18-hexaoxatricosanyl p-nonylphenyl ether.

In an embodiment of this invention a soil stabilizing composition comprises an aqueous solution of calcium polysulfide and lignin sulfonate.

Lignin sulfonate is available as the sodium, potassium, ammonium, calcium and other salts from the sulfite process of pulp production. (See Kirk-Othmer's "Encyclopedia of Chemical Technology", 2nd Edition, Vol. 12, p. 361–381.) Since lignin sulfonate salt solutions are mostly acidic, they must be used with small amounts of base to prevent hydrogen sulfide evolution when mixed with calcium polysulfide. Preferably, the solution contains sufficient base to prevent the evolution of $H_2S$ when the lignin sulfonate salt solution is mixed with the calcium polysulfide solution. For example, preparation is made by adding aqueous sodium hydroxide or ammonia to the lignin sulfonate and then mixing in the calcium polysulfide solution. Typically, 1.7 grams of 50% NaOH will be needed to raise the pH of 100 grams of lignin sulfonate (50% active) from pH 4.3 to 7.

The lignin sulfonate is normally present in the composition in amounts based on its weight ratio to calcium polysulfide sufficient to improve the wet strength of treated soil, preferably in weight ratio of lignin sulfonate to calcium polysulfide of about 1:1-10, more preferably about 1:1-4, and most preferably about 1:1-2. Preferably, the lignin sulfonate and calcium polysulfide are present in the composition so that their combined total weight is 8-15 weight percent based on the weight of dry soil to which said composition is applied, more preferably, 9 to 14%. Emulsifier may be used for purposes of assisting soil penetration.

Other materials which may be optionally present in the soil stabilizing composition, or which are used in conjunction with the soil stabilizing composition in treating soils and soil structures, include paints, pigments and water repellents.

In an embodiment of this invention, a soil stabilizing composition comprises an aqueous solution of calcium polysulfide and a water-soluble silicone. Such silicones are fluid and water soluble silicones which sometimes find use as water repellent treating materials and are described in Kirk-Othmer's, "Encyclopedia of Chemical Technology", 2nd Edition, Volume 18, pages 221-260. Silicones are added to aqueous calcium polysulfide solutions both with and without dispersed organic polymer, and both with and without emulsifier. Silicones are normally added to the aqueous calcium polysulfide composition in sufficient amount to provide wet strength to the stabilized soil, and preferably in amounts of about 0.1 to 10 weight percent silicones based on the dry weight of the soil to which the composition has been applied. A particularly preferred class of silicones are the alkali metal methyl siliconates such as sodium methyl siliconate, $CH_3Si(OH)_2ONa$, which in the presence of water and carbon dioxide forms $CH_3SI(OH)_3$ and $Na_2CO_3$. $n[CH_3Si(OH)_3]$, in turn, condenses to $[CH_3SiO_{3/2}]_n + (3/2)nH_2O$ (Walter Noll, "Chemistry and Technology of Silicones", Academic Press, New York, 1968).

In treating soil, various methods can be used. Thus, the stabilizing compositions of this invention may be sprayed onto or flowed onto the soil surface. Application may take place over an extended period of time. For example, a small portion may be applied each day, until sufficient of the polysulfide is present to insure adequate soil surface stabilization.

In another embodiment, these compositions may be mixed with soil in a mixer at a rate of from about 0.1 to 15 percent by weight of the dissolved polysulfide to the dry weight of the soil or an aggregate-soil mixture. The mixture may then be spread and compacted on an untreated soil as a construction base.

The dispersed polymeric compositions are prepared by simply mixing the polysulfide solution with the latex in desired proportions.

Application rates to any surface will vary with the degree of stabilization desired. Usually from about 120 to 1200, preferably 200 to 1000, $g/m^2$ of solids will be sufficient to stabilize most soils. However, higher or lower concentrations will sometimes be employed for other purposes.

In the formation of earthen structures such as dams, etc., the calcium polysulfide or calcium polysulfide-latex compositions will be mixed with soil and the structure formed. Wet strength, even under saturation conditions, of the structures is greatly enhanced.

In like manner, the compositions can be mixed with soils and the materials placed in forms to make earthen building or "adobe" building bricks.

Another substantial use lies in the economical protection of existing, previously unstabilized earth-based structures, such as older adobe construction, wherein the spraying of the compositions onto the surfaces gives enhanced protection from weathering.

In some cases, it may be desired to pigment the materials. In such cases, pigments compatible with the compositions, such as latex paints, etc., may be blended with the compositions.

The following examples illustrate embodiments of the invention. The examples are simply illustrative and nonlimiting.

EXAMPLE I

LABORATORY TEST OF CALCIUM POLYSULFIDE-TREATED SOIL

The following method was employed for determining the strengthening effects of various soil treatments. A 115-g metal cup (about 6-cm inner diameter and 3.8-cm deep) was packed with moist soil (about 10% water or sufficient to allow good compaction). The sample was dried for 24 hours at 38° C. in an oven. Stabilizing agents were then poured over the surface in pre-weighed amounts. Control samples (with no chemical treatment) were wetted with an equivalent amount of distilled water.

All of the samples, including the controls, were dried for 24 hours at 38° C. in the oven prior to strength testing.

The soil crust strength was determined by placing a 2.54-cm diameter steel ball in the center of the soil surface and pushing the ball through the surface crust with an Instron tester operated at 1.27 cm per minute. The crust yield strength was determined from a force-displacement plot recorded directly from the Instron tester.

The following tests were performed on a sandy clay soil. The soil contained about 20% by weight of kaolinite clay; the rest fine sand. About 50% passes a 200-mesh sieve in wet sieve test. The organic matter was nil.

The calcium polysulfide was in the form of a 29% by weight aqueous solution containing 6.6% by weight calcium and 23.3% by weight sulfur. Density of the solution was 1.26 kg/liter (39° Baume at 18° C.). The soil treatment results may be found in the following tables.

TABLE I

| Calcium Polysulfide Treatment of Sandy Clay | | | |
|---|---|---|---|
| | Calcium Polysulfide | Soil Crush Strength, kg[1] | |
| Test | Application, $g/m^2$ | Dry | Wet[2] |
| 1 | None (control) | 4.3 | 1.8 |
| 2 | 827 | 142 | 5.9 |
| 3 | 414 | 127 | 1.35 |

TABLE I-continued

| | Calcium Polysulfide | Soil Crush Strength, kg[1] | |
|---|---|---|---|
| Test | Application, g/m² | Dry | Wet[2] |
| 4 | 83 | 111 | Too soft to measure |

[1]Average of 3 tests.
[2]Treated sample immersed in water 24 hours prior to testing, while control sample wet with only 6.0 g water and allowed to stand 48 hours before testing. Control has 0 strength when saturated.

These data show that on this particular soil, dry strength is significantly increased by treatment with calcium polysulfide solution. Wet strength is significantly increased at higher concentration levels.

Sandy loam samples comprising mainly montmorillonite clay were obtained. These soils were characterized as follows:

TABLE II

| | | | Soil Description | | | | |
|---|---|---|---|---|---|---|---|
| | | | | Screen Analysis, % Through | | | |
| Soil | Soil Description | Organic Content | <40 Mesh | 40 Mesh | 80 Mesh | 200 Mesh | 325 Mesh |
| A | Black, obtained near surface | 7.5 | 62.5 | 23 | 8 | 4 | 2.5 |
| B | Yellow, from 2.4-m depth | 6.0 | 74 | 15.5 | 4 | 3.5 | 3.0 |
| C | Garden soil | — | — | — | — | — | — |

These soils were tested for strength as in Example I; the results are set forth in Table III.

TABLE III

| | Calcium Polysulfide Treatment of Sandy Loam | | |
|---|---|---|---|
| | Calcium Polysulfide | Soil Crush Strength, kg. | |
| Soil | Application, g/m² | Dry | Wet |
| A | None (control) | 1.7 | Too soft to measure |
| | 416[1] | 4.6 | 2.3 |
| B | None (control) | 0.9 | Too soft to measure |
| | 416[1] | 4.6 | 2.3 |
| C | None (control) | 30 | Too soft to measure |
| | 827[2] | 103 | Too soft to measure |
| | 416[2] | 66 | Too soft to measure |

[1]Applied as 15% aqueous solution.
[2]Applied as 29% aqueous solution.

These data show that with a variety of soils application of substantial quantities of calcium polysulfide substantially increases dry strength and with some increases wet strength.

EXAMPLE II

Road Stabilization Test

An area of a dirt road receiving substantial truck traffic was sprayed with calcium polysulfide solution. A 3.76-m² area (Area 1) was treated with a 29% polysulfide solution at a polysulfide rate of 919 g/m². A 18.8-m² area (Area 2) was coated with the polysulfide in 19% solution at a rate of 110 g/m². Inspection was after 19 days and several hard rains: Area 1 when disturbed gave no dust; Area 2 gave a little dust. Inspection after two months and more heavy rains showed that Area 1 showed slight dust improvement. Area 2 showed no discernible difference from untreated area.

EXAMPLE III

Road Stabilization Test

A section of rural dirt road was sprayed with calcium polysulfide. A sample of the road soil, a heavy clay mainly montmorillonite containing considerable gravel, was taken and gave the following screen analysis:
Through 40 mesh screen 16%
Through 80 mesh screen 12%
Through 200 mesh screen 5%
Through 325mesh screen 2%

The soil was tested for strength by the method described in Example I, giving the following results:

| | Soil Crush Strength, kg. | |
|---|---|---|
| Soil Treatment | Dry | Wet |
| Control (no treatment) | 4.0 | Too soft to measure |
| Calcium polysulfide, 827 g/m² | 56 | 1.0 |

A 53.5-m² area of the road was sprayed with 114 liters of a 15.9% solution of calcium polysulfide (application rate=387.5 g/m²). The test area was inspected after 4 days. The area was slightly lighter in color. Dust evolution from passing vehicles was reduced by about 80% compared with the untreated road surface. Twenty-one days after the original application, the test section was treated with an additional 67 liters of 15.9 % calcium polysulfide (251 g/m²) the total application was 638 g/meter. Inspection after about one and a half months showed the soil in the area hard, cracked, but controlling vehicle dust.

After an additional month, inspection showed dust control to be excellent. The treated soil had cracked into small plates 3.8 to 7.6 cm in diameter. No further deterioration had occurred.

The test was inspected approximately 9 months after the original application. Dust control was still evident. However, substantial soil had been carried over from the untreated portion of the road.

EXAMPLE IV

Spray Test of Stabilized Soil Blocks and Mortar

Several sets of 3 unstabilized soil blocks obtained from a commercial adobe brick manufacturer were mortared together with mud made from the same soil used in making the bricks. These mortared block sets were dried for several weeks at room temperature and then sprayed at a rate of about 0.1 gal/yd² (0.45 liter/m²) of surface with 29% aqueous calcium polysulfide solution, and with a solution containing 26% calcium polysulfide and 10% Airflex 510 Latex, a dispersion of ethylene vinyl acetate copolymer, 55% solids, dispersed with hydroxyethyl cellulose (Air Products and Chemicals, Inc.). The blocks were then dried for a week at ambient temperature and physically arranged in a circular configuration around a rotating garden water sprayer. The specimens were sprayed with water for 8 hours a day for 5 days. At the end of this time, an untreated mortared set of blocks was badly eroded and had collapsed, while the stabilized blocks were intact, showing no signs of erosional damage.

EXAMPLE V

Spray Test of Stabilized Plastered Soil Blocks

Several sets of 2 unstabilized soil blocks were mortared together with soil mortar as in Example 1 and allowed to dry. Each set was plastered on all surfaces except the bottom with a layer of mud about 1.3 cm thick. Each set was prepared using a separate mud composition. These mud sets were made with the following formulations:
1. Soils with 12% water (control);
2. Soils with 15% of 29% aqueous calcium polysulfide solution;
3. Soil with 15% of aqueous mixture containing 26% calcium polysulfide and 10% Airflex 510 Latex (see Example IV) and
4. Soil with 15% of aqueous mixture containing 26% calcium polysulfide and 10% Airflex 500 Latex (same polymer as Airflex 510 Latex with a different emulsifier).

After drying for several days, these plastered block sets were arranged around a garden water sprayer and sprayed for 120 hours. The unstabilized block set completely collapsed after 24 hours of spraying. The other all withstood the test without extensive damage. The set stabilized with calcium polysulfide alone suffered slight damage due to small cracks in the plaster, which allowed water to enter the unstabilized core. The blocks plastered with calcium polysulfide latex soil mixtures displayed no damage.

EXAMPLE VI

Stabilized Wall Tests

Four test walls, about 123 cm high, 137 cm long and 15.2 cm thick, were constructed on a concrete base pad located in a marshy area on the shore of a salt-water bay. Unstabilized adobe soil blocks from a commercial adobe manufacturer were used. These were mortared together with mud made from water and the same soil as used in making the blocks. After drying for several days, 3 of the walls were sprayed with stabilizing liquids of this invention at the indicated solids application, as follows:
1. Aqueous calcium polysulfide solution, 29% active (application rate 182 g/m² solids);
2. Mixture of 26% calcium polysulfide and 10% Airflex 510 Latex (application rate 159.6 g of calcium polysulfide, 33.6 g of polymer per square meter); and
3. Mixture of 27.6% calcium polysulfide and 5% Airflex 510 Latex (application rate 168 g of calcium polysulfide, 16.8 g polymer per square meter).

The fourth wall was left untreated as a control.

After treatment, all of the walls were wrapped in plastic sheet for 2 weeks to prevent possible premature damage by rain and allow a reasonable drying time.

After the plastic was removed, and within the next 2 weeks, several rainstorms occurred. The unstabilized control wall completely collapsed. The stabilized walls showed no damage. Eight months later, the three stabilized walls were still standing. The walls stabilized with calcium polysulfide latex mixtures showed no damage, with the exception of some erosion along the bottom 5 cm due to tidal action which takes place during certain periods. The wall stabilized with calcium polysulfide solution alone showed slight erosional damage on the southern face, which is against the prevailing winds, as well as damage along the base due to tidal action, but is generally in good condition.

EXAMPLE VII

Soil Stabilization Test

Two areas of sandy ground surface were sprayed with aqueous mixtures of calcium polysulfide and ethylene-vinyl acetate copolymer latex (same as in Example I), at the following solids application concentrations:
1. 1111 g of calcium polysulfide plus 235 g of polymer (Airflex 500) per square meter; and
2. 1111 g of calcium polysulfide plus 235 g of polymer (Airflex 510) per square meter.

The surfaces were examined after a period of about 3.5 months. Neither surface had experienced significant erosion. They retained excellent resistance to physical damage. Untreated soil in the area showed substantial erosion.

EXAMPLE VIII

Strength Tests of Soil BLocks Prepared with Calcium Polysulfide-Polymer Mixtures Soil blocks were prepared by mixing (1) liquid compositions containing calcium polysulfide and (2) aqueous mixtures of the polysulfide and latexes with soil from a commercial adobe brick plant and curing them for 10 days in an oven at 53° C.

Compressive strengths were obtained on 5 cm cubes with a Baldwin Press run at 2.54 cm per minute. Specimens for the wet-strength test were immersed for 24 hours and tested immediately.

Tensile strengths were obtained on "bone"-shaped specimens of 1.27-cm² cross-section at the midpoint. These were pulled on the Instron Tester at a rate of 0.508 cm per minute. Wet-strength specimens were immersed for 1 hour and tested immediately.

All results are the average of tests on 3 specimens.

Table IV gives the strength data and the percent of calcium polysulfide and polymer in the material (based on the weight of dry soil).

TABLE IV

Strength Tests of Stabilized Soil Blocks

| Test | Weight Percent, dry soil basis | | Strength | | | |
|---|---|---|---|---|---|---|
| | | | Compressive | | Tensile | |
| | Ca Polysulfide | Polymer | Dry, kg/cm² | Wet, kg/cm² | Dry, kg/cm² | Wet, kg/cm² |
| A[1] | 0 | 0 | 18.1 | 0 | 4.1 | 0 |
| B[2] | 0.58 | 0 | 17.3 | 0 | 3.7 | 0 |
| C[2] | 1.13 | 0 | 14.1 | 0 | 2.5 | 0 |
| D[2] | 1.86 | 0 | 14.9 | 0 | 1.6 | 0 |
| E[2] | 2.76 | 0 | 32.0 | 2.2 | 5.1 | 0 |
| F[2] | 3.54 | 0 | 36.6 | 2.1 | 4.8 | 0.7 |
| G[2] | 4.35 | 0 | 59.8 | 5.9 | 17.2 | 4.2 |
| H[3] | 0.52 | 0.11 | 18.1 | 0 | 5.6 | 0 |
| I[3] | 1.01 | 0.21 | 27.7 | 1.1 | 4.9 | 0 |
| J[3] | 1.66 | 0.35 | 30.3 | 1.8 | 1.6 | 0.3 |
| K[3] | 2.44 | 0.52 | 46.6 | 3.4 | 11.1 | 0.6 |
| L[3] | 3.17 | 0.67 | 59.8 | 4.6 | 21.2 | 0.7 |
| M[3] | 3.90 | 0.83 | 108.6 | 7.2 | 15.2 | 1.6 |

TABLE IV-continued

Strength Tests of Stabilized Soil Blocks

| Test | Weight Percent, dry soil basis | | Strength | | | |
|---|---|---|---|---|---|---|
| | Ca Poly- sulfide | Poly- mer | Compressive | | Tensile | |
| | | | Dry, kg/cm$^2$ | Wet, kg/cm$^2$ | Dry, kg/cm$^2$ | Wet, kg/cm$^2$ |
| N[4] | 3.90 | 0.83 | 100.8 | — | — | — |
| O[4] | 3.90 | 0.41 | 80.9 | — | — | — |

[1]Control (no stabilizer)
[2]Calcium polysulfide alone
[3]Calcium polysulfide + ethylene vinyl acetate polymer (Airflex 510)
[4]Calcium polysulfide + vinyl acetate-butyl acrylate copolymer (UCAR 508)

These data show the significant increase in compressive and tensile strength imparted by the calcium polysulfide-polymer combinations at various concentrations.

EXAMPLE IX

Weather-O-Meter Test of Calcium Polysulfide/Polymer-Coated Soil Blocks

Five-cm cubes of soil were dried, weighed and dipped in compositions of this invention. They were then blot-dried, reweighed and allowed to air-dry for 48 hours, at which time they were reweighed. The cubes were then placed in a Weather-O-Meter apparatus and exposed to alternate water spray and ultraviolet light at 60° C. for 91 days at 22 hours per day. The compositions in which the materials were dipped comprise 26% by weight of calcium polysulfide and the indicated weight percentage of the various dispersed polymers, with the balance being water. The polymers employed were as follows:

1. 5.0% by weight vinyl acetate-butyl acrylate copolymer (from UCAR 508, Union Carbide Co.);
2. 5.0% by weight urethane latex (from Urethane X-103, Wyandotte Chemical Co.);
3. 5.0% by weight vinyl acrylic copolymer (from Flexbond FL315, Air Products and Chemicals, Inc.);
4. 5.0% by weight ethylene vinyl acetate (from Airflex 100 HS latex);
5. 5% by weight ethylene-vinyl acetate (from Airflex 500):
6. 5.5% by weight ethylene-vinyl acetate (from Airflex 510).

Table V shows the results of the test after the exposure period.

TABLE V

Weather-O-Meter Exposure of Soil Blocks Treated

| | Weights of Blocks (grams) | | | | | |
|---|---|---|---|---|---|---|
| | 1 | 2 | 3 | 4 | 5 | 6 |
| Initial weight | 246 | 259 | 289 | 302 | 270 | 219 |
| Weight after dipping & blot drying | 252 | 265 | 295 | 307 | 275 | 224 |
| Samples cured at room temperature over weekend | 248 | 261 | 291 | 304 | 271 | 220 |
| Weights after curing in Weather-O-Meter for 91 days at 22 hrs/day (equivalent to 5.24 years of nomal outside exposure) | 235.7 | 246.5 | 289.1 | 301.4 | 269.6 | 215.8 |

An untreated block collapses within about 10 days under these conditions. Therefore, stabilization with the compositions of this invention greatly enhances the weather resistance of the blocks.

Compressive strength tests on two-inch cubes of soil mixed with various ratios of calcium polysulfide solution and ammonium lignin sulfonate or calcium lignin sulfonate are shown in the Tables VI and VII, respectively. A control mix with calcium lignin sulfonate alone was not included in Table VII since the wet strength of bricks made with calcium lignin sulfonate alone would be very poor on account of its high water solubility. The soil was obtained from a commercial adobe brick manufacturer. Two factors are important in obtaining wet strength: the total amount of stabilizers and the ratio of lignin sulfonate to calcium polysulfide solution. High concentrations of lignin sulfonate degrade wet strength although the dry strength is increased. (Soil bricks made with water alone have a dry compressive strength of only 250–300 psi and zero wet strength).

TABLE VI

| Test | Weight Percent Dry Soil Basis | | | Wt. Ratio Ca Poly- sulfide to Lignin Sulfonate | Compressive Strength | |
|---|---|---|---|---|---|---|
| | NaOH | Ca Poly- sulfide | Ammonium Lignin Sulfonate | | Dry[1] kg/cm$^2$ | Wet[2] kg/cm$^2$ |
| 1 | 0 | 0 | 6.8 | 0 | 1356 | 0 |
| 2 | 0.3 | 1.3 | 3.2 | 0.41 | 988 | 0 |
| 3 | 0.2 | 2.5 | 2.1 | 1.19 | 663 | 56 |
| 4 | 0.5 | 2.5 | 2.0 | 1.25 | 581 | 28 |
| 5 | 0.6 | 2.5 | 6.3 | 0.40 | 1406 | 0 |
| 6 | 0.9 | 3.8 | 9.5 | 0.40 | 1412 | 0 |
| 7 | 0.1 | 3.8 | 1.1 | 3.5 | 575 | 0 |
| 8 | 0.4 | 5.0 | 4.2 | 1.19 | 956 | 148 |
| 9 | 1.0 | 5.0 | 4.0 | 1.25 | 744 | 155 |
| 10 | 0.6 | 7.5 | 6.3 | 1.19 | 769 | 98 |
| 11 | 1.5 | 7.5 | 6.0 | 1.25 | 1413 | 369 |
| 12 | 0.2 | 7.5 | 2.1 | 3.57 | 693 | 48 |
| 13 | 0.3 | 11.3 | 3.2 | 3.53 | 994 | 198 |

[1]Cured one week at 130° F.
[2]Cured one week at 130° F. then soaked 24 hours in water.

TABLE VII

| Test | Weight Percent, Dry Soil Basis | | | Weight Ratio Ca Polysulfide to Lignin Sulfonate | Compressive Strength | |
|---|---|---|---|---|---|---|
| | NH$_3$ | Ca Poly- Sulfide | Calcium Lignin Sulfonate | | Dry[2] kg/cm$^2$ | Wet[3] kg/cm$^2$ |
| 1 | 1.1 | 3.8 | 10.2 | 0.37 | 1413 | 0 |
| 2 | 0.7 | 2.5 | 6.8 | 0.37 | 994 | 134 |
| 3 | 0.8 | 7.5 | 6.8 | 1.1 | 1219 | 90 |
| 4 | 0.5 | 5.0 | 4.5 | 1.1 | 1050 | 363 |
| 5 | 0.4 | 1.3 | 3.4 | 0.38 | 1056 | 90 |
| 6 | 0.4 | 11.3 | 3.4 | 3.3 | 1000 | 31 |
| 7 | 0.3 | 7.5 | 2.3 | 3.3 | 656 | 352 |
| 8 | 0.3 | 2.3 | 2.3 | 1 | 681 | 334 |
| 9[1] | 0 | 15.6 | 1.9 | 8.2 | 1600 | 315 |
| 10 | 0.1 | 3.8 | 1.1 | 3.4 | 506 | 9 |

[1]1.9 wt.% of latex.
[2]See footnote 1, Table VI.
[3]See footnote 2, Table VI.

In another embodiment, a soil stabilizing composition consisting of about 29 weight percent calcium polysulfide, about 1 weight percent sodium methyl siliconate (Dow Corning 772) and water, was applied to soil so that on a dry soil basis the treated soil contained about 4.8 weight percent calcium polysulfide and about 0.17 weight percent silicone. The treated soil had a compressive dry strength of 638 kg/cm$^2$ after curing 24 hours at room temperature and 1 week at 130° F., and a compressive wet strength of 100 kg/cm$^2$ after identical curing and 24 hours soaking in water. The same soil treated with only calcium polysulfide solution (about 5.2 weight percent calcium polysulfide, dry soil basis) had compressive strengths of 294 kg/cm² (dry) and 53 kg/cm² (wet) after identical curing and soaking respectively.

The compositions of the invention have many other substantial uses. Another application lies in applying the compositions to concrete structures immediately after pouring in order to provide extra strength to the concrete during the curing process.

What is claimed is:

1. A soil stabilizing composition comprising an aqueous solution of calcium polysulfide containing sufficient emulsifier compatible with calcium polysulfide to aid the composition in soil penetration and dispersed particles of an organic polymer of number average molecular weight of about 5,000 to 600,000 and having an average particle size of from about 0.005 to 10 microns, wherein said calcium polysulfide contains an average of from about 2 to about 7 atoms of sulfur per atom of calcium.

2. The composition of claim 1 in which said emulsifier is present in an amount of about 0.001 to 5 weight percent.

3. The composition of claim 1 in which said emulsifier is present in an amount of about 0.05 to 5 weight percent.

4. The composition of claim 1 in which said organic polymer is present in an amount of about 0.001–15 weight percent.

5. The composition of claim 1 in which said organic polymer is present in an amount of about 0.02–14 weight percent.

6. The composition of claims 1, 2 or 3 in which said calcium polysulfide is present in an amount of about 5 to 30 percent by weight.

7. The composition of claims 1, 4 or 5 in which said polymer has a number average molecular weight of about 20,000 to 200,000.

8. The composition of claims 1, 4, or 5 wherein said polymer is a vinyl acetate butyl acrylate copolymer or an ethylene vinyl acetate copolymer.

9. The composition of claims 1, 2, or 4 in which said calcium polysulfide is present in an amount of about 0.5 to 30 weight percent.

10. The composition of claims 1, 2, or 4 in which said emulsifier is an alkoxylated alkyl amine or hydroxy ethyl cellulose.

11. The composition of claim 1 which contains, in addition, lignin sulfonate in weight ratio to calcium polysulfide of about 1:1–10.

12. The composition of claim 11 which contains lignin sulfonate and calcium polysulfide in combined total weight percent of about 8–15 percent based on the weight of dry soil to which said composition is applied.

13. The composition of claim 1 which contains, in addition, lignin sulfonate in weight ratio to calcium polysulfide of about 1:1–4.

14. The composition of claim 1 which contains, in addition, sufficient water soluble silicone to provide wet strength to the stabilized soil.

15. A soil stabilizing composition comprising an aqueous solution of calcium polysulfide and lignin sulfonate, and containing sufficient base to prevent hydrogen sulfide evolution.

16. The composition of claim 15 containing lignin sulfonate and calcium polysulfide in weight ratio of about 1:1–10.

17. The composition of claim 16 containing lignin sulfonate and calcium polysulfide in combined total weight percent of about 8–15% based on the weight of dry soil to which said composition is applied.

18. The composition of claim 16 wherein the ratio is 1:1–4.

19. A soil stabilizing composition comprising an aqueous solution of calcium polysulfide and sufficient water soluble silicone to provide wet strength to the stabilized soil, wherein said calcium polysulfide contains an average from about 2 to about 7 atoms of sulfur per atom of calcium.

20. The composition of claim 19 wherein said silicone is alkali metal methyl siliconate.

21. A soil stabilizing composition comprising an aqueous solution of calcium polysulfide and in an amount sufficient to impart wet strength to the soil treated with said composition, dispersed particles of organic polymer of number average molecular weight of about 5,000 to 600,000 and having an average particle size of from about 0.05–10 microns, wherein said calcium polysulfide contains an average of from about 2 to 7 atoms of sulfur per atom of calcium.

22. The composition of claim 21 wherein said polymer has a number average molecular weight of about 20,000–200,000.

23. The composition of claim 21 wherein said polymer is ethylene vinyl acetate copolymer or vinyl acetate butyl acrylate copolymer.

24. The composition of claim 21 wherein said composition contains, in addition, sufficient emulsifier compatible with calcium polysulfide to stabilize said dispersed particles of organic polymer.

25. A soil stabilizing composition comprising an aqueous solution of calcium polysulfide containing about 2 to 5 atoms of sulfur per atom of calcium, sufficient emulsifier compatible with calcium polysulfide to aid the composition in soil penetration, and, optionally, dispersed particles of an organic polymer having an average particle size of about 0.005 to 10 microns and a number average molecular weight of about 5,000 to 600,000.

26. A method of stabilizing soil surfaces to prevent damage from water, wind erosion or physical impact comprising the application of the composition of claims 1, 2, 4, 11, 15, 19, 21 or 25 at an application rate of from about 200 to 1,000 grams of dissolved calcium polysulfide per square meter.

27. A method of stabilizing soil surfaces to prevent damage from water, wind, erosion or physical impact comprising the application of the composition of claims 1, 2, 4, 11, 15, 19, 21 or 25 at an application rate of from about 200 to 1,000 grams of dissolved calcium polysulfide per square meter, wherein the composition is sprayed onto the soil surface.

28. A method of stabilizing soil surfaces to prevent damage from water, wind, erosion, or physical impact comprising the applicaton of the composition of claims 1, 2, 4, 11, 15, 19, 21, or 25 at an application rate of from about 200 to 1,000 grams of dissolved calcium polysulfide per square meter, wherein the soil or soil-aggregate mixture is mechanically mixed with said composition at a ratio of from about 0.1 to 15 weight percent of dissolved calcium polysulfide to dry soil, and the treated soil is applied to a soil surface as a construction base.

* * * * *

UNITED STATES PATENT AND TRADEMARK OFFICE
CERTIFICATE OF CORRECTION

PATENT NO. : 4,243,563
DATED : January 6, 1981
INVENTOR(S) : Richard L. Ferm

It is certified that error appears in the above–identified patent and that said Letters Patent are hereby corrected as shown below:

Column 11, line 44, "5. 5% by weight" should read
--5. 5.5% by weight--.

Column 13, line 33, "0.02-14 weight" should read
--0.02-15 weight--.

Signed and Sealed this

Seventh Day of April 1981

[SEAL]

Attest:

RENE D. TEGTMEYER

Attesting Officer    Acting Commissioner of Patents and Trademarks

Disclaimer and Dedication 4,243,563.—*Richard L. Ferm*, Lafayette, Calif. CALCIUM POLYSULFIDE SOIL STABILIZATION METHOD AND COMPOSITIONS. Patent dated Jan. 6, 1981. Disclaimer and dedication filed Sept. 23, 1985, by the assignee, *Chevron Research Co.*

Hereby disclaims and dedicates to the public the remaining term of said patent.

[*Official Gazette November 19, 1985.*]